United States Patent [19]

Romberg

[11] 4,015,823
[45] Apr. 5, 1977

[54] WIRE STRETCHER AND FASTENER

[76] Inventor: Felix B. Romberg, P.O. Box 218, Holland, Tex. 76534

[22] Filed: Dec. 22, 1975

[21] Appl. No.: 643,000

[52] U.S. Cl. .............................................. 254/72
[51] Int. Cl.² ........................................ B66F 1/04
[58] Field of Search .................. 254/68, 71–72

[56] References Cited
UNITED STATES PATENTS

| 1,884,057 | 10/1932 | McLean | 254/72 |
| 2,012,212 | 8/1935 | Witzee | 254/72 |
| 3,825,228 | 7/1974 | Greutman | 254/71 |

*Primary Examiner*—Al Lawrence Smith
*Assistant Examiner*—Robert C. Watson
*Attorney, Agent, or Firm*—Richards, Harris & Medlock

[57] ABSTRACT

A wire stretcher and fastener is provided for first tensioning and then securing barbed wire to an adjacent fencepost, or the like. Tensioning is effected by means of a pawl and ratchet mechanism, and fastening is effected by rotating the incoming and outgoing lengths of wire around one another while maintaining full tension.

12 Claims, 12 Drawing Figures

WIRE STRETCHER AND FASTENER

BACKGROUND AND SUMMARY OF THE INVENTION

Heretofore, barbed wire has generally been manually fastened to a post or gate end after being stretched to it. This procedure is time consuming and results in unequal wire tension on opposite sides of the post. Moreover, there can be some relaxing of wire tension when the wire stretcher is disengaged which leads to difficulty in properly tensioning short lengths of wire, such as gate wires.

With the present invention the wire is first looped around the post. The outgoing and incoming lengths of wire on opposite sides of the post are then drawn longitudinally towards each other with the wire stretcher, after which the wire stretcher is rotated to wind the outgoing and incoming lengths of wire about each other between the wire stretcher and the post. The wire further tensions by the winding process and remains at maximum tension when the wire stretcher is disengaged.

Since the wire stretcher maintains full and even tension in the two lengths of wire as it winds them about each other, the resulting connection is distinctly tight and stable without sharp bends. When applied to short lengths of wire such as gate wires, the connection may be wound further to eliminate slack, should slack develop in service.

DESCRIPTION OF THE DRAWINGS

For a more complete understanding of the present invention and its objects and advantages, reference may now be had to the following Detailed Description taken in conjunction with the accompanying Drawings in which.

DETAILED DESCRIPTION

Figure 3:
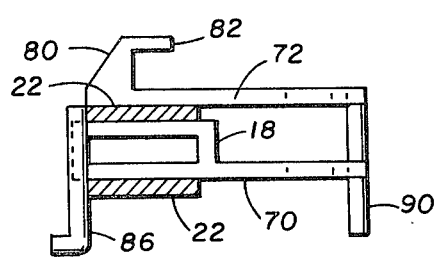
FIG. 3 is a sectional view taken along line 3—3 of FIG. 2.
Figure 2:
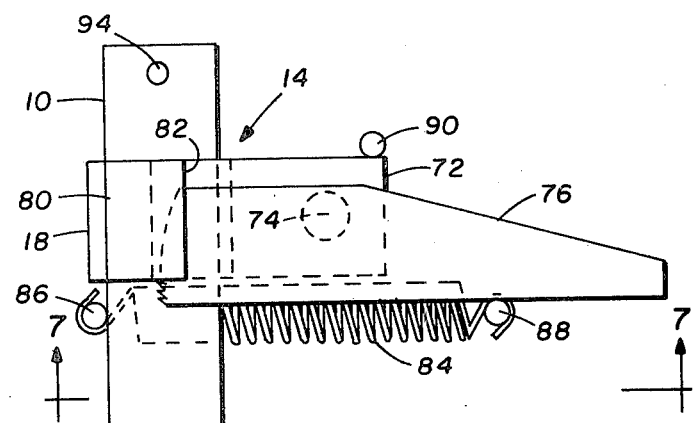
FIG. 2 is a side view of the frame which receives the ratchet bar.
Figure 2:
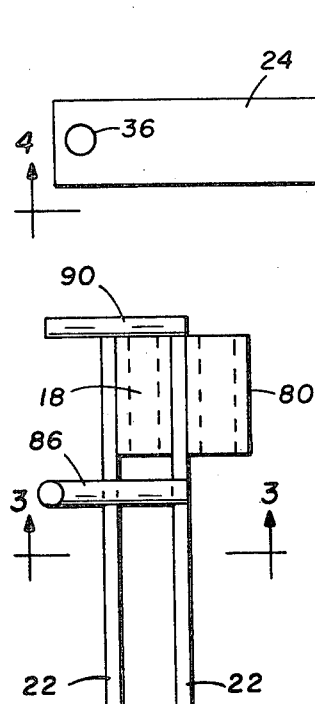
Figure 1:
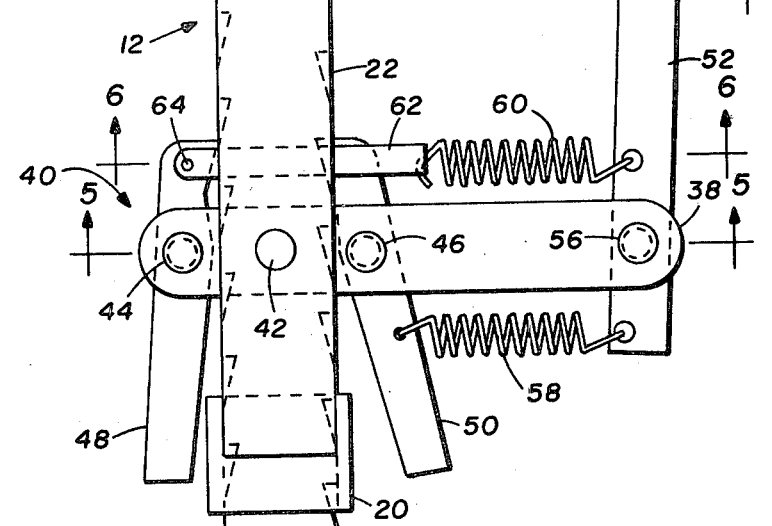
FIG. 1 is a fragmentary plan view of the wire clamping side of a wire stretcher and fastener comprising a first embodiment of the invention with the wire clamping lever of the ratchet bar in its open position and with the other wire clamping lever, the driving lever and driven lever shown perpendicular to the ratchet bar.
Figure 1:
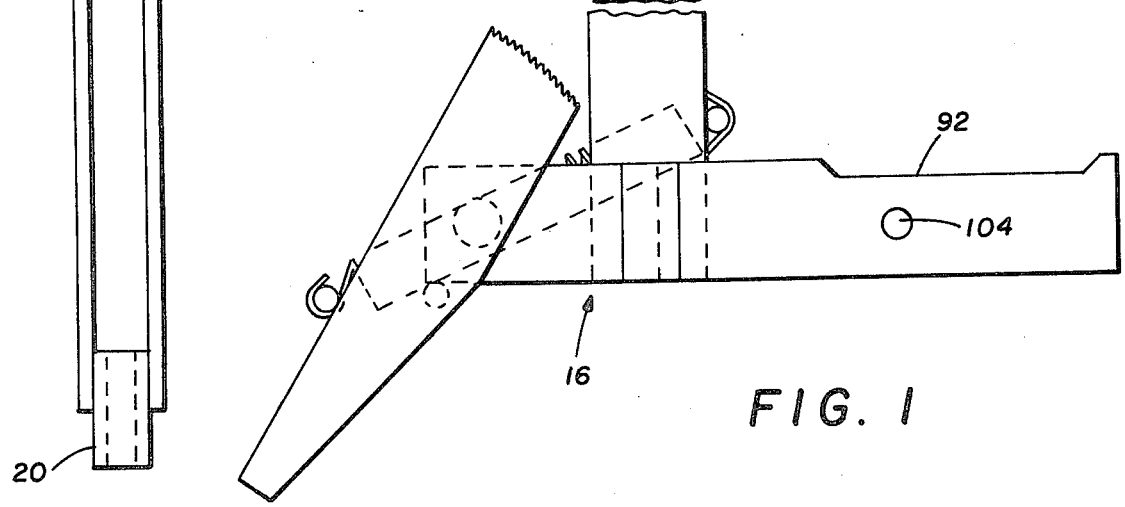

Referring to FIGS. 1 and 2, a ratchet bar 10 and a frame 12 are slidable longitudinally relative to each other. One wire clamp 14 is on one end of the frame 12 and another wire clamp 16 is at the end of the ratchet bar 10 situated beyond the opposite end of the frame. The ratchet bar 10 is flat and extends through spaced, open ended guide boxes 18 and 20 of the frame. Dual flat longitudinal frame members 22 are integral with and extend between the guide boxes 18 and 20 and are spaced from the opposite flat sides of the ratchet bar by the wall thickness of the guide boxes.

Figure 4:
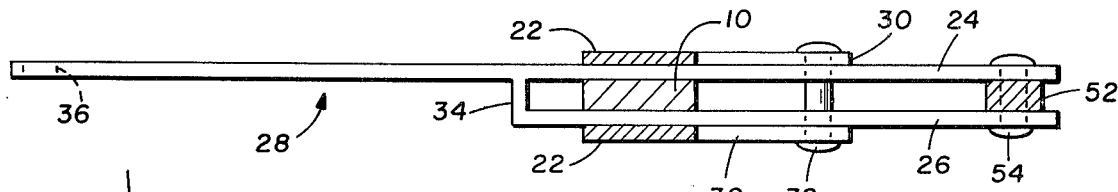
FIGS. 4, 5, 6 and 7 are sectional view taken along lines 4—4, 5—5, 6—6 and 7—7, respectively, of FIG. 1.

As is best shown in FIGS. 1 and 4, a pair of flat members 24 and 26 comprising a driving lever 28 pass through the spaces between the frame members 22 and the opposite flat sides of the ratchet bar 10. Mounted in laterally extending frame sections 30 of the dual longitudinal frame members 22 is a cross pin 32 which fulcrums the driving lever 28 between the sections 30. The shorter flat member 26 of the driving lever 28 is bent perpendicularly and united with the longer flat member 24 at 34 where the perpendicular portion contacts the ratchet bar 10 after the driving lever 28 has been fully pivoted in each direction. Beyond the union with the flat member 26, the member 24 serves as a handle and may have a perforation 36 for connection to a spring scale to determine the approximate tension of a wire being stretched.

Figure 5:
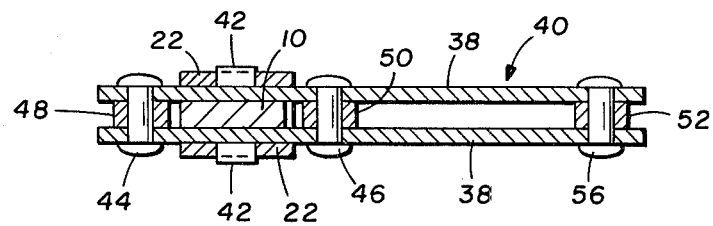

Referring to FIGS. 1 and 5, the dual flat members 38 of the driven lever 40 pass through the spaces between the ratchet bar 10 and the dual longitudinal frame members 22. The driven lever 40 is fulcrumed by trunnions 42 extending from the sides of the dual flat members 38 through suitable openings centered in the longitudinal frame members 22. Mounted in the flat members 38 beyond the opposite sides of the frame members 22 and equidistant from the trunnions 42 are cross pins 44 and 46 which fulcrum, respectively, a pair of pawls 48 and 50 between the dual members 38 of the driven lever 40.

Figure 6:
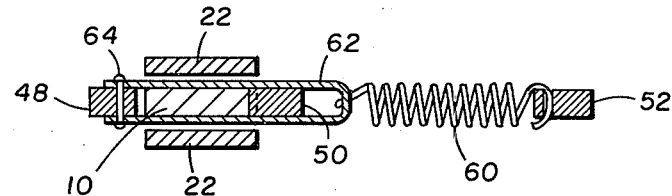
Figure 7:
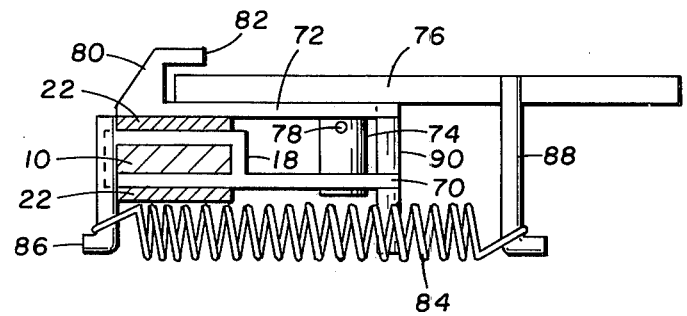

A connecting rod 52 is pivotally connected by cross pins 54 and 56 with the driving and driven ends of levers 28 and 40, respectively. The connecting rod 52 extends beyond the driven lever 40 where it supports one end of a helical tension spring 58 which extends to the handle end of pawl 50. On the opposite side of lever 40 another helical tension spring 60 is extended from the connecting rod 52 to the closed end of the clevis 62 (FIGS. 1 and 6). Beyond the closed end the clevis 62 straddles the pawl 50, the ratchet bar 10 and the pawl 48. The clevis 62 is pivotally secured to the pawl 48 by a cross pin 64.

The springs 58 and 60 are parallel to and remain parallel to the driven lever 40 during its pivotal movements. To the advantage of these springs, the pivotal movements of the driven lever 40 are of a reduced amplitude relative to the pivotal movements of the driving lever 28. This is true because the cross pin 56 has a much longer pivotal radius than the cross pin 54. The dual flat members 38 of the driven lever 40 may be rigidly interconnected, if desired.

The flat ratchet bar 10 has on each of its narrow sides a series of equally spaced notches. Each notch is defined by a perpendicular shoulder 66 and a slanted side 68. The shoulders of all notches face towards that end of the ratchet bar which bears the wire clamp 16, and the shoulders on one side of the ratchet bar are spaced longitudinally midway between the shoulders on the opposite side. The pawls 48 and 50 alternately advance the ratchet bar in a manner common to the art. The handles of the pawls 48 and 50 extend along the guide box 20 where their adjacent edges are tapered for proper clearance.

The broad dimension of the ratchet bar 10 is in a common plane with levers 28 and 40, the connecting rod 52 and the pawls 48 and 50. The wire clamps are considered to open on the top side of that plane because the wire can be more easily directed into the jaws of the clamps from above. The pawls 48 and 50 can be engaged by the operator from either the top or the bottom.

As is best shown in FIGS. 1, 2, 3 and 7, a flat member 70 extends perpendicularly to one side of the guide box 18, and another flat member 72 overlies the upper longitudinal frame member 22 above the guide box 18 and extends parallel to the member 70. These two flat members have registering perforations that receive a pivot shaft 74 which is integral with a clamping lever 76. A pin 78 through the shaft 74 beneath the flat member 72 prevents upward displacement of the lever 76.

A jaw block 80 is integral with the flat member 72 above the guide box 18 and cooperates with the clamping lever in gripping a wire therebetween. The jaw block 80 has a top portion 82 which covers the wire gripping end of the clamping lever when in use. The guide box 18, longitudinal members 22 and perpendicular flat member 72 with the jaw block are secured rigidly together as by welding. The wire gripping end of the clamping lever is serrated and hardened.

To urge the clamping lever 76 against a wire at the jaw block 80, a helical spring 84 is disposed beneath the lower frame member 22 where it is tensioned between rods 86 and 88 integral with frame members 22 and the clamping lever, respectively. Like the clamping lever of the clamp 14 at the end of the ratchet bar, the clamping lever 76 may be retained in an open position with the spring 84 resting over center against a stop rod 90 extending from flat members 70 and 72.

Figure 8:
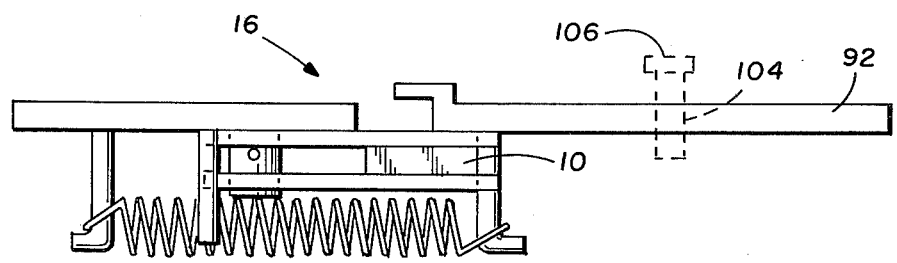
FIG. 8 is an end view of the ratchet bar at the wire clamping and wire winding parts.

The wire clamp 16 (FIGS. 1 and 8) at the end of the ratchet bar is similar to the wire clamp 14, except that the clamping lever is opposed in wire gripping by one end of a wire winding arm 92 which is rigidly connected with the ratchet bar and extends perpendicularly thereto on the opposite side from the clamping lever.

To extend the distance between the two wire clamps 14 and 16, the handle ends of the pawls 48 and 50 are pressed towards each other to release the ratchet bar 10, while the wire stretcher is inclined so the ratchet bar slides down until the terminal pin 94 at the end of the ratchet bar engages the guide box 18.

To stretch and fasten a wire to a post or gate end 96 (FIG. 9), the wire is looped around the post. The clamp 16 is then attached to the end of the outgoing length 98 of the wire and the clamp 14 is attached to the incoming length 100 of the wire as far as from the post 96 as is conveniently possible. The wire is then stretched by manipulating the driving lever 28. When the tension of the wire is sufficient, the wire stretcher is rotated to produce the tie. The broken lines 98a and 100a indicate how the outgoing and incoming lengths of the wire become crossed as a first result of the rotating. Further rotating of the wire stretcher winds the two lengths of wire about each other between the clamp 16 and the post 96 along the dotted line 102.

Figure 9:
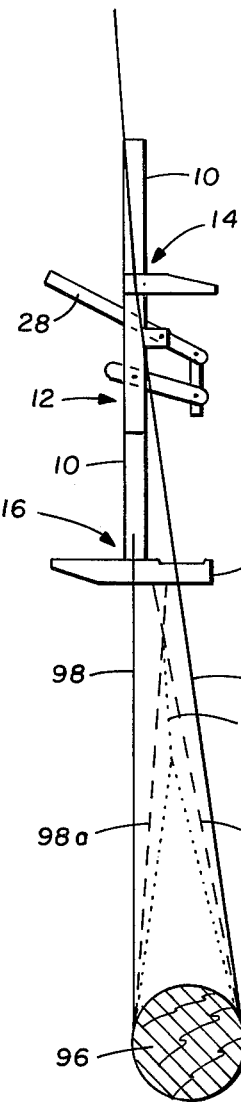
FIG. 9 is a diagram illustrating the wire winding operation.

The wire is preferably looped around the post in the direction that results in the incoming length 100 of the wire passing over the arm 92 as shown in FIG. 9. The wire stretcher is then rotated so this arm immediately engages the wire. If the wire is looped around the post in the reverse direction from that shown in FIG. 9, the incoming length of wire will pass over the wire clamp 16 and the wire stretcher is rotated in the reverse direction so the wire clamp engages the incoming length of wire to make the tie.

The wire winding arm 92 has one or more perforations 104 along its length. A bolt 106 (FIG. 8) may be inserted in such a perforation to keep the incoming length 100 of the wire spaced from the gripped end of the outgoing length 98 of the wire when the tie is made and thereby increase the angle between the wires where they cross. Such a greater angle may be desirable with greater distances of the wire stretcher from the post, relative to the diameter of the post.

Figure 10:
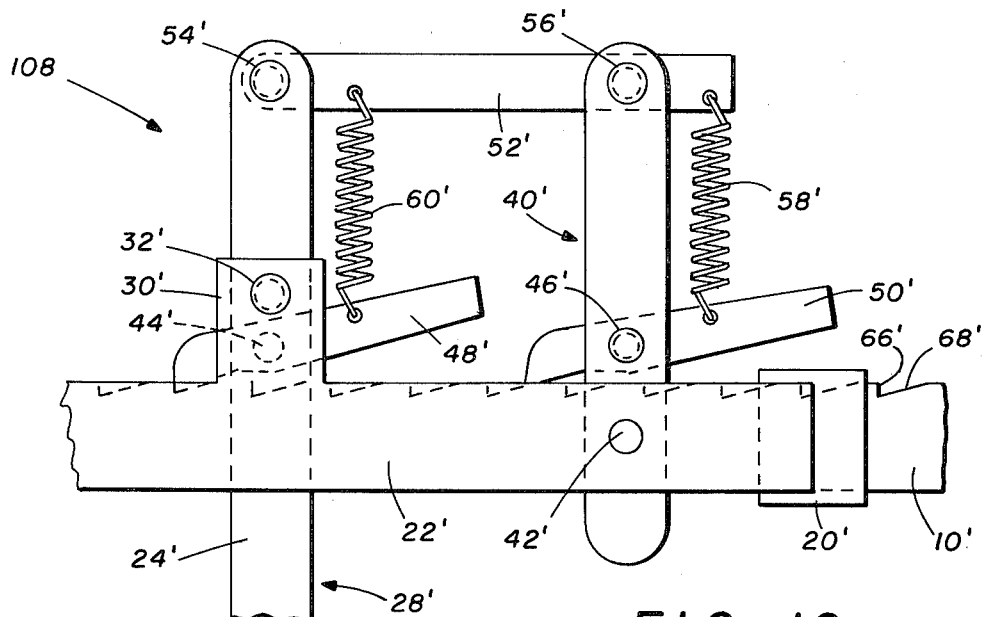
FIG. 10 is an illustration of a second embodiment of the invention.

A wire stretcher and fastener 108 comprises a second embodiment of the invention is illustrated in FIG. 10. The wire stretcher and fastener 108 incorporates various component parts which are substantially identical in construction and function to component parts of the wire stretcher illustrated in FIGS. 1–9. Such identical component parts are designated in FIG. 10 with the same reference numerals utilized hereinbefore in connection with the description of the first embodiment of the invention, but are differentiated therefrom by means of a prime (') designation.

The primary distinction between the first and second embodiments of the invention involves the fact that the wire stretcher and fastener 108 utilizes pawls 48' and 50' positioned on the same side of the ratchet bar 10', the pawl 48' being given movements of the same length and phase as the pawl 48 of the first embodiment by being pivoted along the driving lever 24' a selected distance towards the ratchet bar 10' from the driving lever's fulcrum 32'. The ratchet bar 10' is therefore notched on one side only. This advantage may be somewhat offset by the fact that in certain instances it may be more difficult to simultaneously disengage the pawls 48' and 50' from the ratchet bar 10', as compared with the relative ease of simultaneously disengaging the pawls 48 and 50 from the ratchet bar 10 of the first embodiment of the invention.

Figure 11:
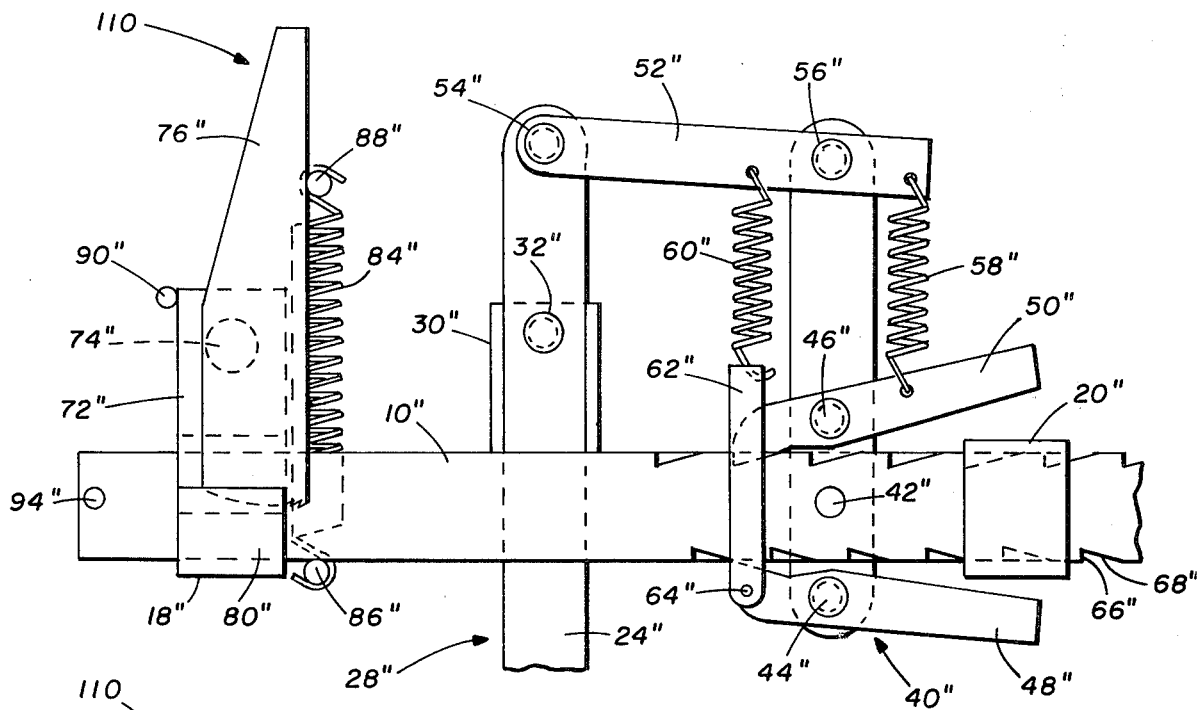
FIG. 11 is an illustration of a third embodiment of the invention.
Figure 12:
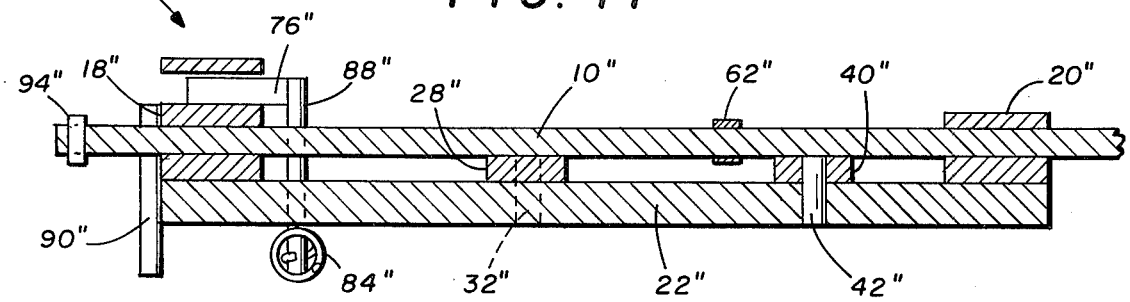
FIG. 12 is a longitudinal sectional view of the third embodiment of the invention.

A wire stretcher and fastener 110 incorporating a third embodiment of the invention is illustrated in FIGS. 11 and 12. The wire stretcher and fastener 110 utilizes numerous component parts which are substantially identical in construction and function to component parts of the first embodiment of the invention as illustrated in FIGS. 1–9. Such identical component parts are designated in FIGS. 11 and 12 with the same reference numerals utilized hereinbefore in the description of the first embodiment of the invention, but are differentiated therefrom by means of a double prime (") designation.

The primary distinction between the wire stretcher and fastener 110 and the first embodiment of the invention involves the fact that the wire stretcher and fastener 110 utilizes a single longitudinal member 22". This advantage may be somewhat offset by the fact that various pivot pins of the wire stretcher and fastener 110 are supported at one end only as opposed to being supported at both ends as is the case in the first embodiment of the invention. Also, the pawls 48" and 50", the associated springs and other component parts of the wire stretcher and fastener 110 are somewhat more exposed to damage than is the case in the first embodiment of the invention due to the presence of the longitudinal members 22 on both sides of the pawls 48 and 50 and the associated component parts of the first embodiment.

From the foregoing it will be understood that the present invention comprises a wire stretcher and fastener incorporating numerous advantages over the prior art. Perhaps the most important advantage involves the fact that by means of the invention a wire is quickly and easily brought up to proper tension and is thereafter readily secured to an adjacent fencepost or similar structure. Another advantage involves the fact that apparatus incorporating the invention may be manufactured from a relatively small number of relatively uncomplicated parts and is adapted for relatively long term, substantially maintenance free service, whereby the apparatus is economical both in construction and in use. Other advantages deriving from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A wire stretcher and fastener comprising:
 a flat ratchet bar having a longitudinal axis;
 a frame slidably connected to said ratchet bar for relative movement along said ratchet bar;
 two clamps constructed and positioned to grip wire along said longitudinal axis;
 one of said clamp being mounted at one end of said ratchet bar and the other being mounted at the remote end of said frame;
 drive means mounted on said frame for selectively moving said frame and ratchet bar relative to each other and thereby drawing the two clamps towards each other;
 the wire clamp on said ratchet bar projecting laterally from said ratchet bar;
 an arm projecting laterally from said ratchet bar at the same end and in the opposite direction from said wire clamp, for engaging and winding a stretched incoming length of wire with a stretched outgoing length of wire between the end of said ratchet bar and an adjacent post; and
 said laterally projecting arm being perforated for receiving a pin for spacing the incoming length of wire from the outgoing length of wire at that location when the wire stretcher is rotated to fasten the wire.

2. A wire stretcher and fastener comprising:
 a flat ratchet bar;
 a frame;
 guide boxes at the opposite ends of said frame slidably retaining said ratchet bar for longitudinal movement relative to said frame;
 a first wire clamp at one end of said ratchet bar;
 a second wire clamp on said frame at that guide box which is farthest from said first wire clamp;
 drive means mounted on said frame for selectively moving said frame and ratchet bar relatively along each other and thereby draw said wire clamps towards each other;
 said drive means comprising pawls engaging said ratchet bar, a driven lever pivotally connected with said frame, a driving lever and a connecting rod pivotally connecting said driving lever with said driven lever;
 said driving lever extending from said connecting rod on one side of said ratchet bar to a handle end on the other side of said ratchet bar;
 said ratchet bar and said frame being spaced apart between said guide boxes and said driving lever passing between the frame and ratchet bar; and
 a pivot pin mounted on said frame intermediate of said ratchet bar and said connecting rod and fulcruming said driving lever.

3. The wire stretcher and fastener according to claim 2 wherein the frame comprises longitudinal structural members extending along both flat sides of said ratchet bar between said guide boxes.

4. The wire stretcher and fastener according to claim 2 wherein only one frame member extends between said guide boxes and is disposed along one flat side of said ratchet bar.

5. The wire stretcher and fastener according to claim 2 wherein the flat ratchet bar has notches extending along opposite edges thereof and wherein said pawls are pivotally mounted on said driven lever adjacent the opposite notched edges of said ratchet bar.

6. The wire stretcher and fastener according to claim 2 wherein one of said pawls is pivotally mounted on said driving lever between said ratchet bar and the pivot pin fulcruming said driving lever and the other pawl is pivotally mounted on the same side of the ratchet bar on said driven lever.

7. A wire stretcher and fastener comprising:
 a flat ratchet bar with a longitudinal axis and with a series of notches on each of its narrow sides;
 a frame slidably connected with said ratchet bar for relative movement along said ratchet bar;
 two wire clamps constructed and positioned to grip wire along said longitudinal axis;
 one of said wire clamps being mounted at one end of said ratchet bar and the other being mounted at the remote and of said frame;
 drive means mounted on said frame for selectively moving said frame and ratchet bar relatively to each other and thereby draw the clamps towards each other;
 said drive means including a pair of pawls, one adjacent each notched side of said ratchet bar for engaging said ratchet bar at said notches;
 a driven lever pivotally connected with said pawls and pivotally connected with said frame between said pawls;
 a driving lever extending from a handle end on one side of said ratchet bar to a terminal pivot on the other side of said ratchet bar and fulcrumed by an intermediate pivot supported by said frame on the same side of said ratchet bar as said terminal pivot; and
 a connecting rod pivotally connecting said driven lever with said terminal pivot of said driving lever.

8. A wire stretcher according to claim 7 wherein said frame is spaced from said ratchet bar and said driving and driven levers pass through said space from one side of said ratchet bar and frame to the other side.

9. The wire stretcher according to claim 8 wherein said connecting rod projects beyond said driven lever and springs on opposite sides of said driven lever are tensioned between said connecting rod and said pawls to urge said pawls into engagement with said ratchet bar at said notches.

10. The wire stretcher according to claim 7 wherein said driven lever is mounted beyond said driving lever from the wire clamp of said frame, and said pawls have handle ends projecting from said driven lever in the direction away from said driving lever.

11. A wire stretcher and fastener comprising:
a pair of wire clamps;
a flat ratchet bar having a series of notches on each of its narrow sides and having one of said wire clamps at one end;
a frame having spaced guide boxes slidably retaining said ratchet bar and having the other of said wire clamps at one of said guide boxes;
a pair of flat longitudinal frame members connecting said guide boxes and spaced apart between said guide boxes to respectively define spaces with the opposite wide sides of said ratchet bar;
said longitudinal frame members having lateral projections supporting a pivot pin beyond one of the notched sides of the ratchet bar;
a driving lever fulcrumed by said pivot pin and extending from a handle end on the opposite side of said longitudinal frame members to a terminal pivot pin beyond the fulcrum;
said driving lever comprising two flat members straddling said ratchet bar and straddled by said longitudinal frame members and said lateral projections;
a pair of pawls for engaging said ratchet bar at said notches;
a driven lever comprising dual flat members straddling said pawls and said ratchet bar and straddled by said longitudinal frame members;
said driven lever being pivotally connected with a pawl on each notched side of said ratchet bar and pivotally connected with said longitudinal frame members between said pawls and extending to a terminal pivot pin on the same side of said longitudinal frame members as said terminal pivot pin of said driving lever; and
a connecting rod connected with the terminal pivot pins of said driving and driven levers.

12. The wire stretcher fastener according to claim 11 wherein the pawl pivoted on the opposite side of said ratchet bar from said connecting rod is pivotally connected by a straddling structure straddling both of said pawls and said ratchet bar, with a spring tensioned between said straddling structure and said connecting rod to urge said pawl into engagement with the ratchet bar.

* * * * *